United States Patent [19]

Albrecht

[11] Patent Number: 5,033,915

[45] Date of Patent: Jul. 23, 1991

[54] LOW PRESSURE DROP STEAM/WATER CONICAL CYCLONE SEPARATOR

[75] Inventor: Melvin J. Albrecht, Homeworth, Ohio

[73] Assignee: The Babcock & Wilcox Company, New Orleans, La.

[21] Appl. No.: 427,666

[22] Filed: Oct. 27, 1989

[51] Int. Cl.[5] .............. B65G 53/60

[52] U.S. Cl. .............. 406/173; 55/399; 209/144

[58] Field of Search .............. 406/173; 55/399, 422, 55/459.1; 209/132, 133, 142, 144, 211

[56] References Cited

U.S. PATENT DOCUMENTS

| | | | |
|---|---|---|---|
| 418,834 | 1/1890 | Allington et al. | 55/399 |
| 2,271,634 | 2/1942 | Fletcher et al. | 183/83 |
| 2,293,740 | 8/1942 | Kooistra | 122/488 |
| 2,298,285 | 10/1942 | Fletcher | 55/399 |
| 2,321,628 | 10/1943 | Rowand et al. | 183/83 |
| 2,346,672 | 4/1944 | Fletcher | 55/399 |
| 2,395,855 | 2/1946 | Fletcher | 183/80 |
| 2,402,154 | 10/1946 | Fletcher | 122/488 |
| 2,434,637 | 1/1948 | Brister | 183/83 |
| 2,434,663 | 1/1948 | Letvin | 183/83 |
| 2,434,677 | 1/1948 | Stillman | 183/83 |
| 2,532,332 | 12/1950 | Rowand | 183/75 |
| 2,732,028 | 1/1956 | Coulter | 183/31 |
| 2,891,632 | 6/1959 | Coulter | 55/399 |
| 3,885,933 | 5/1975 | Putney | 55/459.1 |
| 4,848,991 | 7/1989 | Bielefeldt | 55/459.1 |
| 4,927,298 | 5/1990 | Tuszko et al. | 406/173 |

OTHER PUBLICATIONS

Steam-Its Generation and use Revised 38th Ed ©1975, The Babcock & Wilcox Company, pp. 1-5 to 1-9.

*Primary Examiner*—Sherman Basinger
*Assistant Examiner*—Stephen P. Avila
*Attorney, Agent, or Firm*—Robert J. Edwards; Vytas R. Matas; Eric Marich

[57] ABSTRACT

A conical cyclone separator for separating steam from water in a steam/water mixture supplied to a steam drum of a boiler, comprises a conical portion with upper and lower cylindrical portions. Unlike conventional separators which include a tangential inlet extending the axial length of the conical portion of the separator only, the disclosed separator has an inlet which extends by approximately 20% of its length over the lower cylindrical portion of the housing and is vertically elongated over the inlet of conventional separators.

3 Claims, 5 Drawing Sheets

LOW PRESSURE DROP STEAM/WATER CONICAL CYCLONE SEPARATOR

FIELD AND BACKGROUND OF THE INVENTION

The present invention relates in general to cyclone separators for separating steam from water, in the steam drum of a boiler.

U.S. Pat. No. 2,271,634 to Fletcher discloses a cylindrical cyclone separator having a circular whirl chamber, a tangential inlet, a central steam outlet located at the top of the circular whirl chamber, and a water outlet located at the bottom of the whirl chamber. To prevent water from being discharged through the steam outlet, means are provided for increasing the downward component of the incoming stream of steam and water mixture. This means is a segmented plate having downwardly and rearwardly inclined edges that causes the incoming steam and water mixture to be deflected downwardly towards the water outlet of the separator.

U.S. Pat. No. 2,293,740 to Kooistra discloses a similarly designed cyclone separator that does not utilize the segmented plate but rather employs a bottom cup at the bottom of the whirl chamber which confines the steam to the upper portion of the whirl chamber and prevents it from passing down into the separated water as it discharges from the whirl chamber, into the drum.

U.S. Pat. No. 2,298,285 to Fletcher discloses another variation of the cylindrical cyclone separator this time employing a rim or cap on top of the cyclone separator steam outlet together with the segmented plate. The rim acts to enhance separation of water and reduction of pressure drop in the separator.

U.S. Pat. No. 2,321,628 to Rowand, et al. discloses a cyclone separator which is closer in configuration to the present standard shown in FIG. 1 of the present application. The circulator whirl chamber in this reference is the frustum of a cone at the upper portion and substantially cylindrical at the lower portion where the water is discharged. Again, a tangential inlet is employed to deliver the steam water mixture into the cyclone separator, and is of a vertical extent substantially equal to that of the tapered portion of the whirl chamber. The tapered configuration acts to direct the entering steam water mixture into a slightly downward direction to prevent upward spread of the deflected water and enhance separation of the steam therefrom.

U.S. Pat. No. 2,346,672 to Fletcher discloses a substantially cylindrical cyclone separator this time having instead of a tangential inlet a large steam/water inlet which extends over a large fraction of the perimeter of the cyclone separator. As indicated in the reference, the inlet can extend to approximately ⅓ of the perimeter of the cyclone separator to provide adequate flow capacities. One object is to produce a separator or densifier which operates effectively with low pressure drop so that it can be advantageously used where only a small pressure head is available.

U.S. Pat. No. 2,395,855, to Fletcher discloses a substantially cylindrical cyclone separator having a tangential inlet and where the steam outlet center is located eccentric of the whirl chamber center to effect enhanced separation of steam from the water. This design also employs the segmented plate seen in the previously described patents.

U.S. Pat. No. 2,402,154 to Fletcher and the aforementioned U.S. Pat. No. 2,395,855 are both divisionals of the same application. The 2,395,855 patent is drawn to the particular type of fluid separator itself; while the 2,402,154 patent is drawn to the combination of this device in a steam generator.

U.S. Pat. No. 2,434,637 to Brister, U.S. Pat. No. 2,434,663 to Letvin and U.S. Pat. No. 2,434,677 to Stillman are all drawn to various aspects of the perforated cone used at the top of the cyclone separator to enhance separation of the steam from the water.

U.S. Pat. No. 2,532,332 to Rowand is drawn to the particular construction of the separators which today are generally considered as secondary scrubbers.

U.S. Pat. No. 2,732,028 to Coulter is also drawn to a cyclone separator device very similar to that employed at this time. The cyclone separator has the aforementioned frustoconical upper section and generally cylindrical lower section with a tangential steam water inlet located on the side of the frustoconical section. The overall emphasis of this reference is drawn to means of simplifying the construction for excessability and repair of the elements located in the steam drum. This is accomplished by dividing the steam space in the drum into separate compartments, one or more of which are open to the water space of the drum into the necessary drum safety valves while one or more of the other compartments are open to the steam and water separators of the drum the saturated steam outlets. Partitions are used to accomplish this division and they are effective in maintaining the separation of the drum components during normal operation but are easily broken when the safety valves are opened.

U.S. Pat. No. 2,891,632 to Coulter is drawn to a cyclone steam separator quite similar to that disclosed in the earlier mentioned Fletcher patent (U.S. Pat. No. 2,346,672) with the exception that instead of the steam water inlet being located only approximately along ⅓ of the circumference of the separator, this cyclone separator has the entire circumference provided with an array of vanes that "slice" the incoming steam water mixture into thin sheets to enhance separation of the steam from the water.

FIG. 1 is a side sectional view of a conventional cyclone separator which is in current use by the assignee of the present application.

The conventional cyclone separator is generally designated 4 and comprises a conical portion 8 to which a vertically elongated tangentially connected steam/water inlet 6 is connected. The inlet 6 corresponds in axial length to the axial length of the conical portion 8.

Cyclone separator 4 includes an upper cylindrical steam outlet 10 which, in use, is surrounded by a cap with a perforated cover (not shown).

A lower cylindrical water outlet 12 having a water outlet ring 14, is connected to the bottom of conical portion 8 for discharging water which has been separated from the steam/water mixture The conventional cyclone separator of FIG. 1, could be improved by decreasing its pressure drop without adversely affecting the capacitor of the separator.

SUMMARY OF THE INVENTION

The present invention seeks to improve the cyclone separator of FIG. 1 by decreasing its pressure drop without adversely affecting its capacity.

The present invention is a modified conical cyclone separator for applications that require a lower pressure drop than the standard conical cyclone would give, for an equivalent number of or an equivalent steam capacity of the separators. The new conical cyclone gives increased capacity for both steam and water, lower pressure drop and is unaffected by water lever fluctuations. The low pressure drop conical cyclone separator is a modified version of the standard conical cyclone separator. The major difference in the two separators is that the new cyclone separator's tangential inlet has been lengthened by 3 inches. This increase in length increases the cyclone inlet flow area by 28%.

The lengthening of the tangential inlet, extends the inlet into the lower cylindrical portion of the cyclone separator.

In the conventional cyclone separator of FIG. 1, the axial length of the conical portion of the separator, and also the coextensive axial length of the inlet, amounts to approximately ½ to total height of the separator. In accordance with the present invention, the axial length of the inlet amounts to approximately 60% of the total height of the separator with approximately 20% of this height extending into the cylindrical portion of the separator.

This modification has been found to substantially decrease the pressure drop of the separator without adversely affecting the capacity of the separator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a graph showing conical cyclone pressure drop versus steam flow for the conventional and improved cyclone separators; and.

DESCRIPTION OF THE PREFERRED EMBODIMENT

Figure 2:
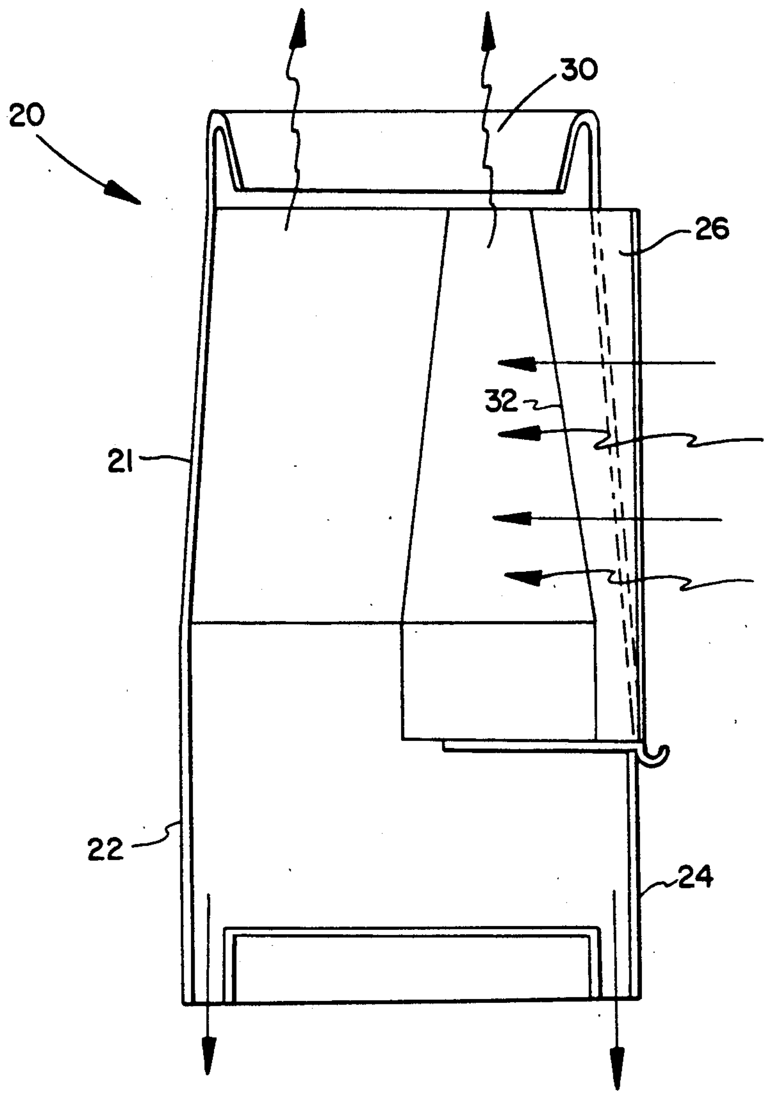
FIG. 2 is a view similar to FIG. 1 of the cyclone separator of the present invention.
Figure 3:
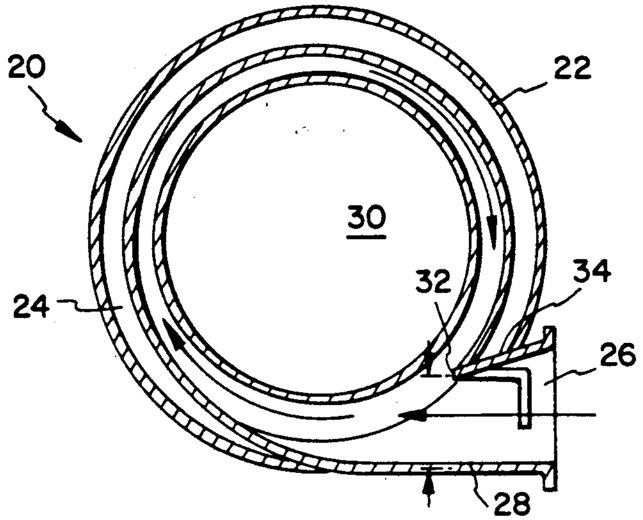
FIG. 3 is a horizontal sectional view of the separator shown in FIG. 2.

Referring to the drawings in particular, the invention embodied in FIGS. 2 and 3 comprises a conical cyclone separator generally designated 20 which is mounted within a steam drum (not shown).

The purpose of a cyclone separator is to improve the efficiency of separation between steam and water in a steam/water mixture, by swirling the mixture at high velocity around the interior of the separator. The greater mass of the water causes it to move to the outside of the swirling stream leaving a concentration of steam which is discharged through the upper cylindrical outlet 30. From outlet 30, the steam is further separated and treated by conventional scrubbers and other equipment (not shown).

The water which has been removed from the mixture is discharged through a lower cylindrical portion 22 and a ring shaped water outlet 24 at the bottom of the separator. The separator includes a main conical portion 21.

An axially elongated tangentially connected steam/-water inlet 26 is connected to the separator. As best shown in FIG. 3, the tangential opening between the inlet 26 and the interior of separator 20, amounts to approximately ⅓ of the circumference of the separator. As with the separator illustrated in FIG. 1, the separator of FIGS. 2 and 3 has a maximum inside diameter of approximately 11.5 inches, with the inlet 26 having a width, in horizontal section, of 2 1/16 inches between a tangential outer wall 28 and the inner edge 32 of an inner wall 34. According to the present invention, the width to height ratio for the inlet 26 is thus approximately 1:6.5. In the conventional separator of FIG. 1, this ratio is approximately 1:5.

Figure 1:
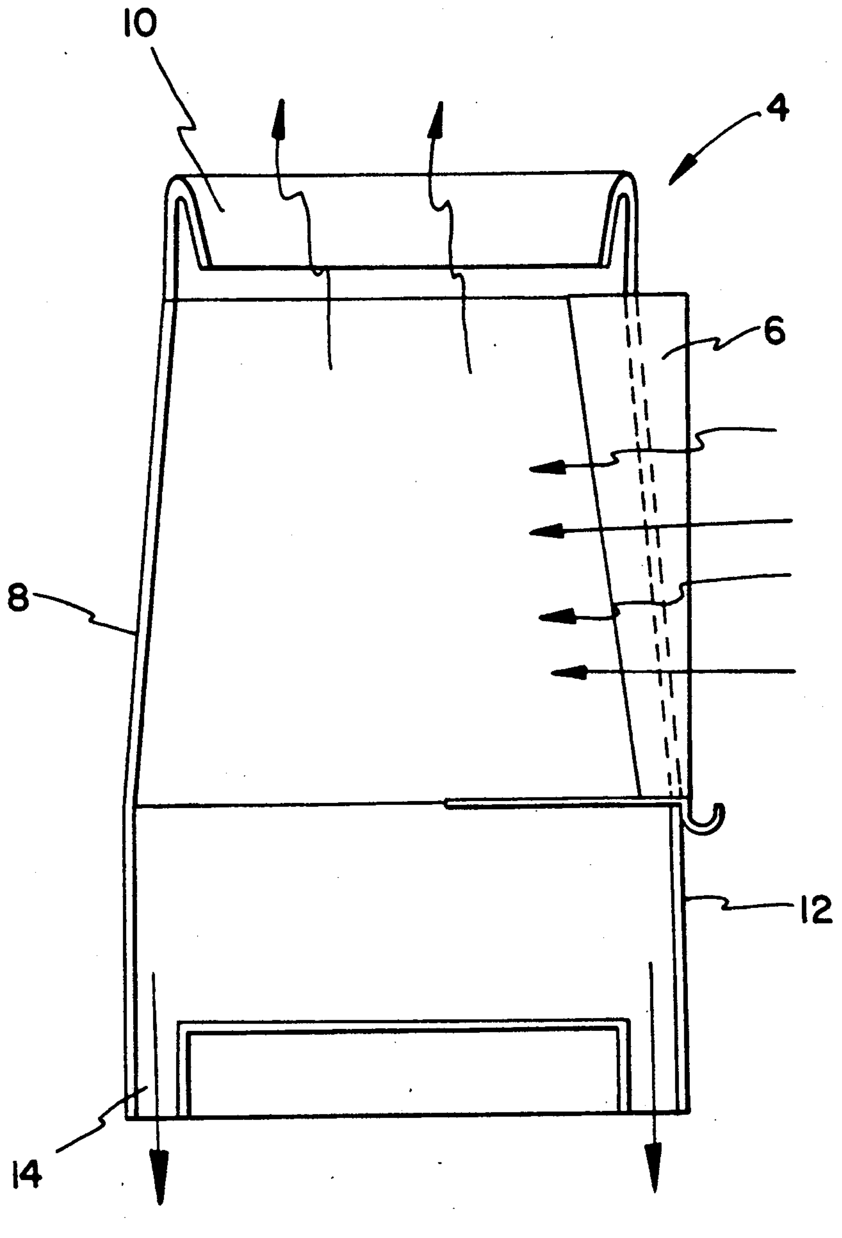
FIG. 1 (PRIOR ART)
FIG. 1 is a vertical sectional view of a conventional conical cyclone separator.

Extensive tests have been conducted to compare the performance of the new conical cyclone separator of FIGS. 2 and 3, from the performance of the conventional separator of FIG. 1.

Figure 4:
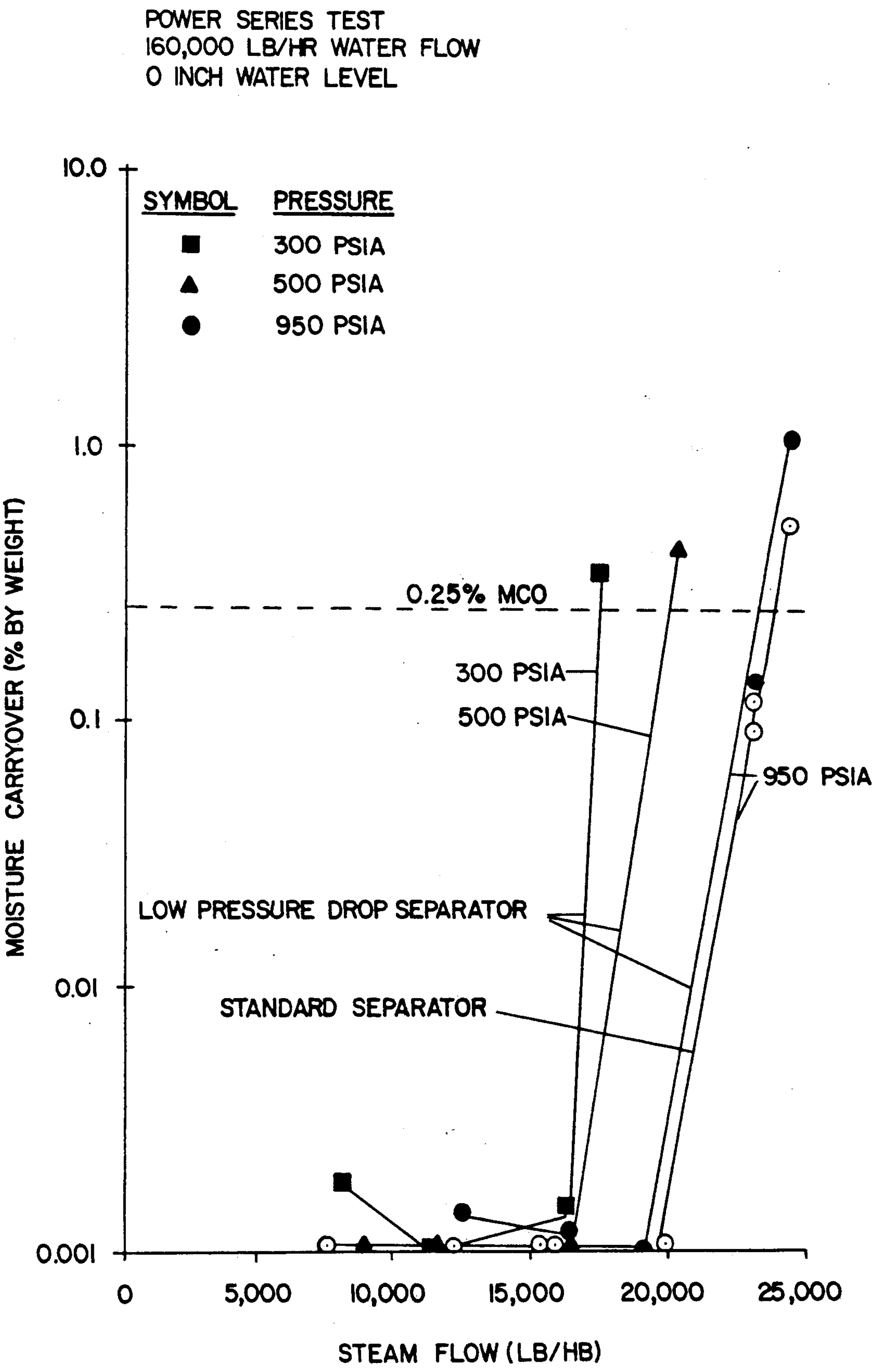
FIG. 4 is a graph showing moisture carryover versus steam flow for the conventional cyclone separator and the improved cyclone separator of the present invention.
Figure 5:
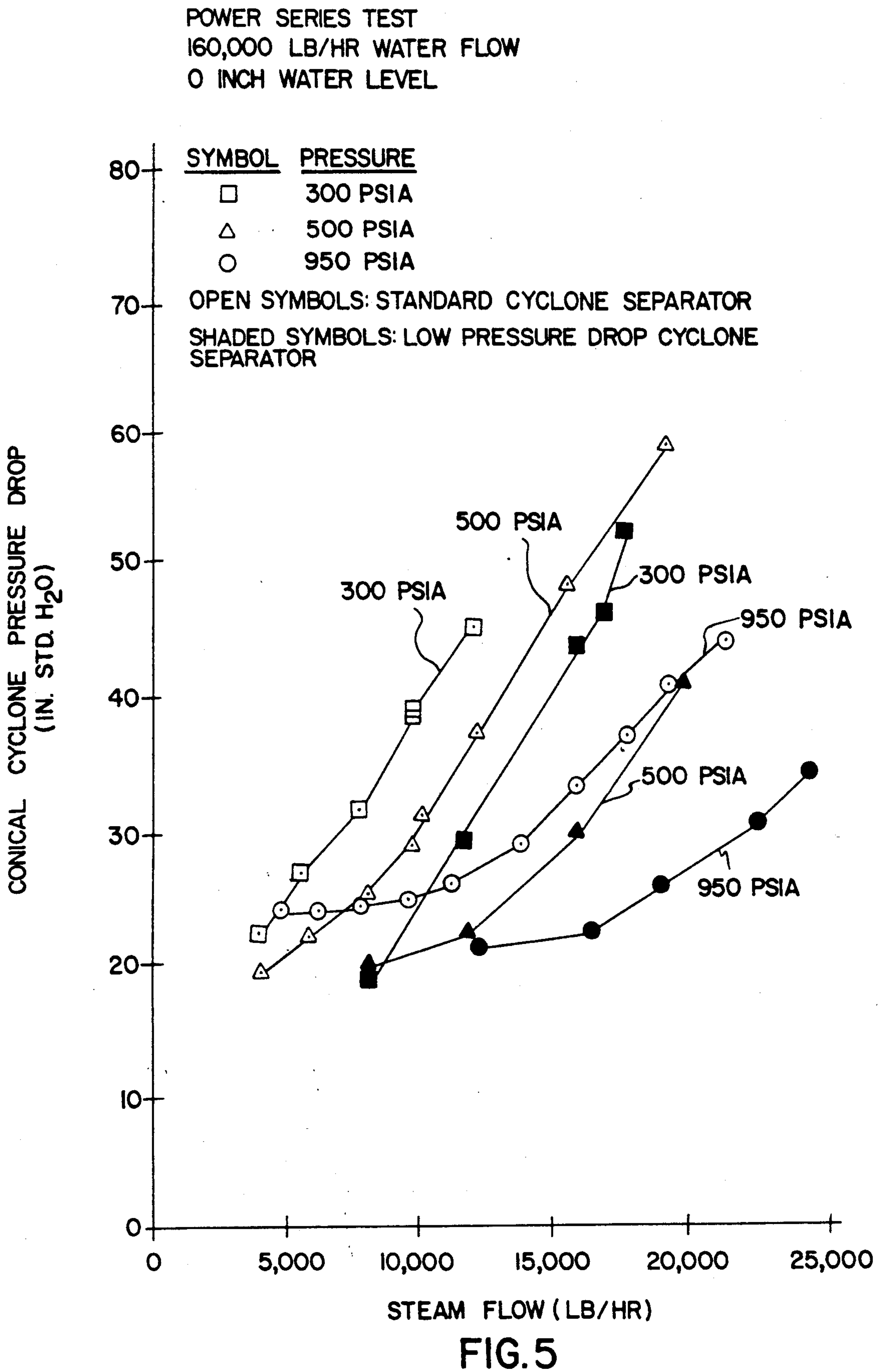
Figure 6:
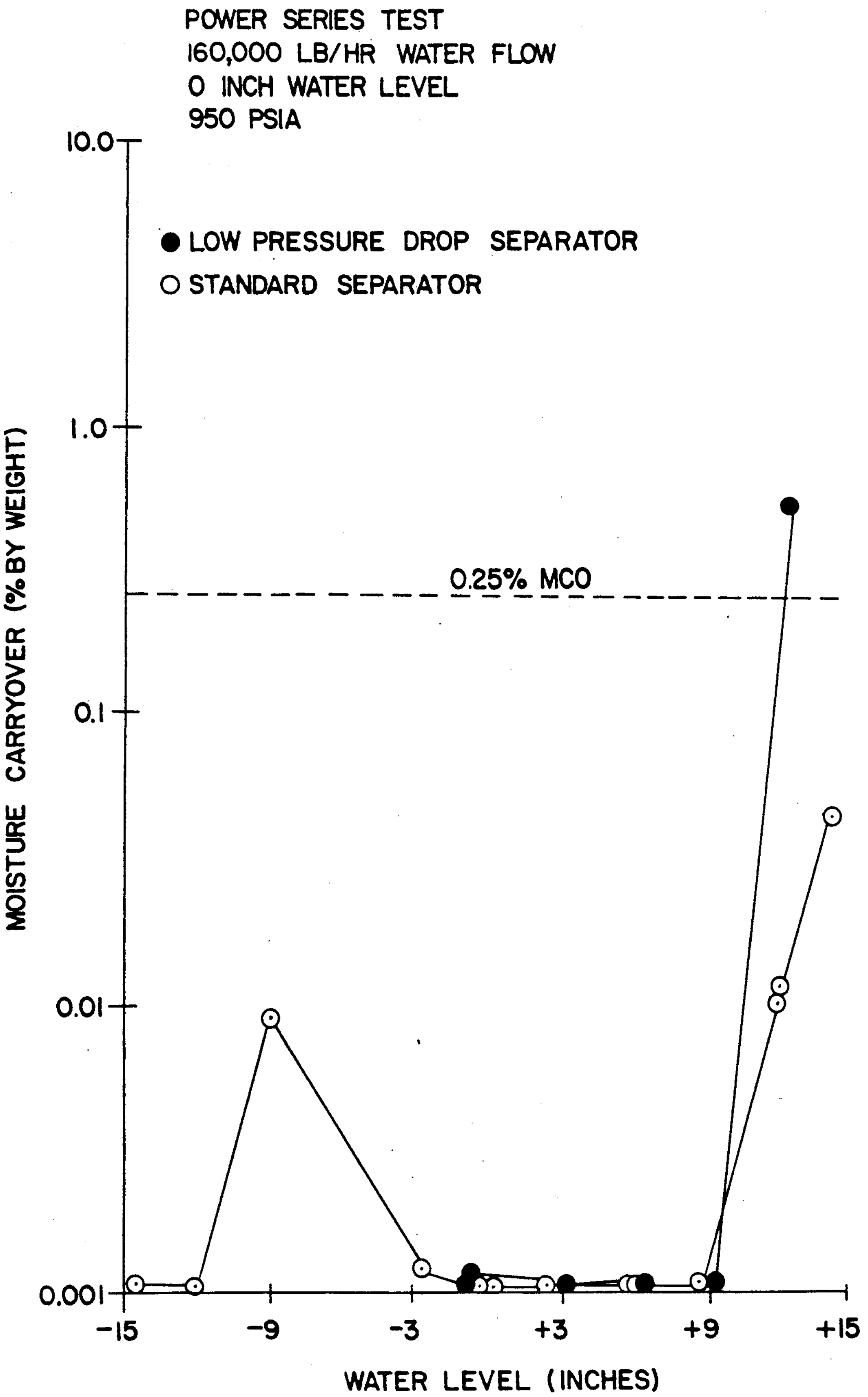
FIG. 6 is a graph showing moisture carryover versus water level for the standard and improved cyclone separators.

In FIGS. 4, 5 and 6, the performance of the new low pressure drop cyclone separator is compared to the standard cyclone separator. As shown in FIG. 4, the steam flow capacity for the separators is the same. In FIG. 5, depending upon flow and pressure conditions, the reduction in pressure drop can range between 25% to 40%. The water level sensitivity results in FIG. 6, show that the low pressure drop cyclone separator did not have a significant impact on water level sensitivity of the arrangement.

Based upon the data shown in FIGS. 4–6, performance of the new low pressure conical cyclone separator has been formulated as follows: (1) steam capacity is the same as the standard 11.5 inch ID conical cyclone separator, and (2) the pressure drop is 30% less than the standard 11.5 inch ID conical cyclone separator.

According to the present invention, thus a relatively simple modification yields substantially improved results in an unexpected manner.

While a specific embodiment of the invention has been shown and described in detail to illustrate the application of the principles of the invention, it will be understood that the invention may be embodied otherwise without departing from such principles.

What is claimed is:

1. A cyclone separator for separating steam from water in a steam/water mixture, comprising:

a separator housing having a conical portion with an axial length, an upper edge and a lower edge, an upper cylindrical steam outlet portion connected to the upper edge of the conical portion and having a central opening for discharging steam from the housing, a lower cylindrical water outlet portion having a bottom water outlet ring for discharging water from the housing, and an axially elongated steam/water mixture inlet connected tangentially to the housing, the inlet having a width to height ratio of approximately 1:6.5, an axial length amounting to approximately 60% of the axial length of the housing, and wherein the inlet extends the full axial length of the conical portion with approximately 20% of the axial length of the inlet extending over the lower cylindrical portion of the housing.

2. A cyclone separator for separating steam from water in a steam/water mixture, comprising;

a separator housing having a conical portion with an axial length, an upper edge and a lower edge, an upper cylindrical steam outlet portion connected to the upper edge of the conical portion and having a central opening for discharging steam from the housing, a lower cylindrical water outlet portion having a bottom water outlet ring for discharging water from the housing, the housing having a maximum inside diameter of 11.5 inches, and an axially elongated steam/water mixture inlet connected tangentially to the housing, the inlet having a width to height ratio of approximately 1:6.5, an axial length amounting to approximately 60% of the axial length of the housing, and wherein the inlet extends the full axial length of the conical portion with approximately 20% of the axial length of the inlet extending over the lower cylindrical portion of the housing, the inlet extending by approximately 3 inches over the cylindrical portion of the housing.

3. A cyclone separator for separating steam from water in a steam/water mixture, comprising;

a separator housing having a conical portion with an axial length, an upper edge and a lower edge, an upper cylindrical steam outlet portion connected to the upper edge of the conical portion and having a central opening for discharging steam from the housing, a lower cylindrical water outlet portion having a bottom water outlet ring for discharging water from the housing, the housing having a maximum inside diameter of 11.5 inches, and an axially elongated steam/water mixture inlet connected tangentially to the housing, the inlet having a width to height ratio of approximately 1:6.5, an axial length amounting to approximately 60% of the axial length of the housing, and wherein the inlet extends the full axial length of the conical portion with approximately 20% of the axial length of the inlet extending over the lower cylindrical portion of the housing, the inlet extending by approximately 3 inches over the cylindrical portion of the housing, and wherein the inlet includes an outer tangential wall and an inner wall having an inner edge, the inlet having a width between the outer wall and the inner edge of approximately 2 1/16 inches.

* * * * *